United States Patent Office 2,926,941
Patented Mar. 1, 1960

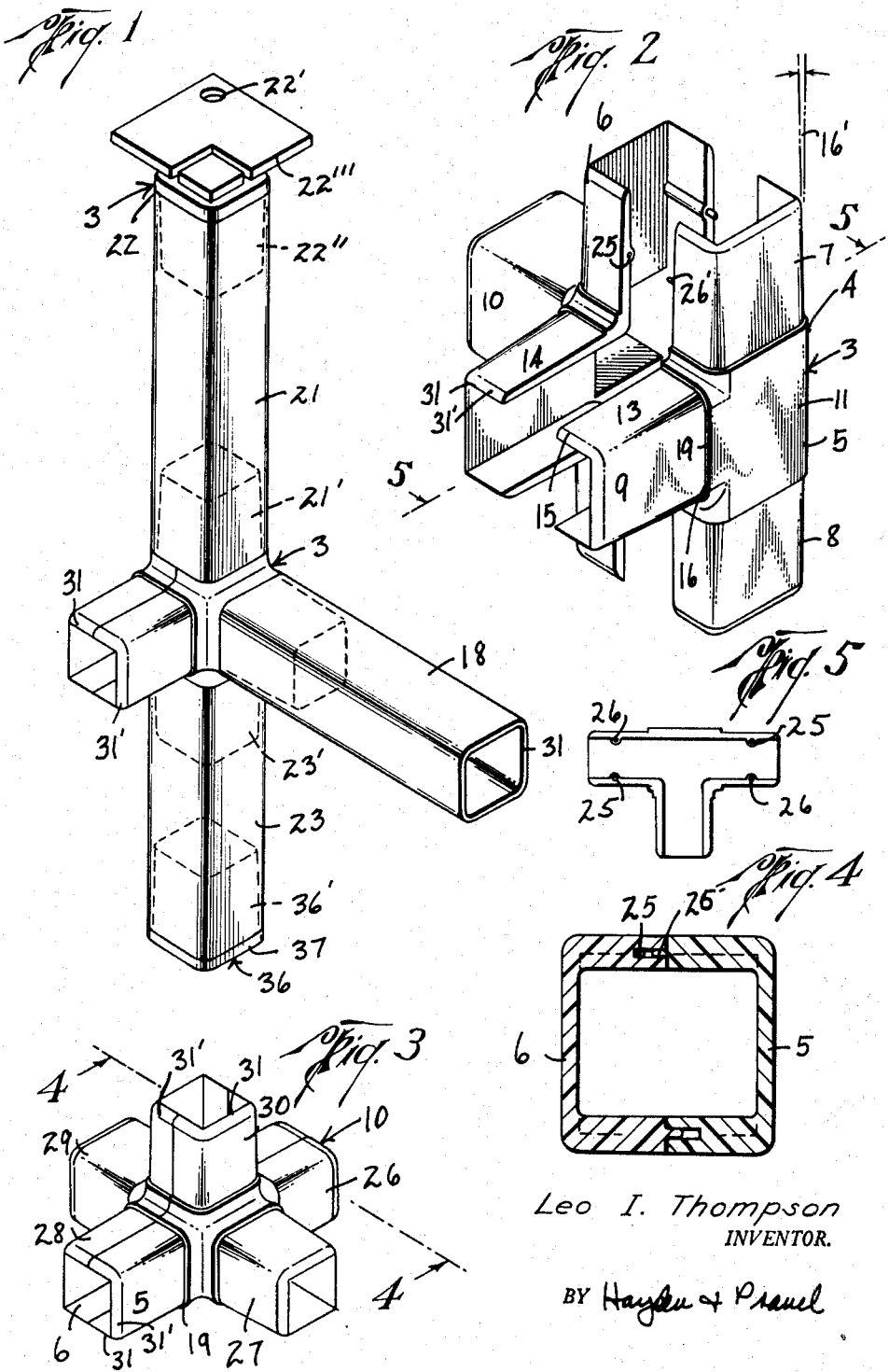

2,926,941

DEVICE FOR CONNECTING MEMBERS TOGETHER

Leo I. Thompson, Opa-Locka, Fla.

Application March 1, 1957, Serial No. 643,283

1 Claim. (Cl. 287—54)

The present invention relates to a device for connecting members together.

Various means and apparatus have been heretofore provided for connecting members together in any desired angular relationship. For example, various devices have been heretofore used to secure or fasten table legs to a table top, chair legs to the chair seat, as well as bracing between the legs and the table top or the chair, such securing means taking the form of screws, bolts, glue, or dowels.

Obviously, in any situation where it is necessary to connect members together, it is necessary to provide some form of fastening means. All of the above arrangements are disadvantageous in that over a period of time they become loose, thereby requiring replacement thereof, and in some instances when the connections have become loose between members, the relative movement between the members has worn the connection location so much that replacement or repair is not readily accomplished.

Furthermore, the above method of connecting various members together is expensive and time consuming, for example, when the members are glued together, the glue must be allowed to set a relatively long period of time to insure proper drying thereof in an endeavor to maintain a connection between the glued members. Obviously, such connecting means is costly when considering the original cost as well as repair and replacement cost throughout the life of the piece of furniture or device in which the connection is made.

The present invention is directed to an adapter for securing members together in any desired angular relation, it being contemplated that such adapter may be used without any auxiliary connecting means such as screws, bolts, glue or dowels.

An object of the present invention is to provide an adapter for connecting elongated members together in any desired angular relation, which adapter firmly and rigidly positions said members relative to each other and retains them in such position without the use of any auxiliary securing means.

Yet a further object of the present invention is to provide an adapter formed of two half mating sections whereby a plurality of projections may be integrally formed in such adapter so as to accommodate a plurality of elongated members by said adapter in any desired angular relation.

Yet a further object of the present invention is to provide an adapter having a plurality of projections thereon for receiving elongated members in a desired angular relation and securing them in said relation rigidly and firmly over an extended period of time.

Yet a further object of the present invention is to provide an adapter having a plurality of projections thereon for receiving elongated members in a desired angular relation and securing them in said relation rigidly and firmly over an extended period of time, said adapter including a tapered surface area on each of the projections whereby the member fitted thereon may be wedged on the projection so as to hold it on the adapter, and a shoulder associated with the tapered surface area so that when the member is abutted thereagainst, it is not only seated on the adapter, but the adapter and connected member then give the appearance of being an integral unit.

Another object is to provide an adapter formed of sections which are provided with means for positioning the sections to form the adapter.

Other objects and advantages of the present invention will become more readily apparent from a consideration of the following description and drawings wherein:

Fig. 1 is an elevation illustrating several forms of the adapters of the present invention as being connected with elongated members for holding the members in a desired angular relation;

Fig. 2 is an exploded isometric view of another form of the adapter of the present invention illustrating the two mating half sections and a plurality of projections, each of which projections is shown as being provided with a tapered surface area;

Fig. 3 illustrates the adapter of the present invention with still additional projections thereon; and Fig. 4 is a sectional view on the line 4—4 of Fig. 3 showing a means for connecting the mating half sections together for locking them in position when they are fitted together; and Fig. 5 is a view illustrating the dowel arrangement for locking or securing mating half sections together.

Fig. 2 the invention is denoted generally by the numeral 3 and comprises a body 4 formed of the two mating half sections 5 and 6.

A central main body portion 11 on each half section 5 and 6 includes a plurality of projection means 7, 8, 9 and 10, which projections extend from the central main body portion 11. It is to be further noted that the projections 7, 8, 9 and 10 each include a tapered surface means designated by the numeral 13. The tapered surface means 13 forms a tapered area on the outer periphery 14 of each of the projections which extend from the main body portion 11.

The tapered surface area on the outer periphery 14 of each of the projections begins at the outer end 15 and extends inwardly to a terminal location represented by the numeral 16, with the thickness of the projections gradually increasing from adjacent their outer ends 15 towards the central body portion 11. The angle of taper is illustrated at 16′ and will be sufficient so that when the tubular member 18 is positioned on any one of the projections extending from the main body portion and abutted against the shoulder 19 formed at the terminal location of the tapered surface 13, such member will be firmly and rigidly held in position on the projection.

It will be noted that the central body portion 11 is of substantial uniform and of greater thickness than the projections extending therefrom so that the shoulder 19 is formed at the termination of the tapered surface 13 on each of the projections. As shown in the drawings, the tapered surface 13 begins at the outer end 15 of the projection means and terminates at a point spaced from the outer end but less than the total length of the projection.

The shoulder 19 also serves the additional function of forming a smooth surface at the point of connection of the projections with the members fitted thereon so that when the adapters are connected with various forms of members as illustrated at 18, 21, and 23 in Fig. 1, such members and the adapter indicated generally at 3 will appear as a unitary structure. Furthermore, the taper on the projection retains the members in rigid relationship on the adapter and holds them in fixed position without requiring the use of any auxiliary securing means such as screws, bolts, glue or dowels.

In order to secure the two half sections 5 and 6 together to form an adapter, dowels 26 are provided in staggered relation on each half section which are adapted to fit in the openings 25 of the adjacent sections whereby the half sections are fastened or locked together while the tubular members such as represented at 18, 21, and 23 in Fig. 1 are secured over the projections. It will be noted that each half section is illustrated as being provided with two dowels 26 and two openings 25 so that the dowels 26 of one half section will fit in the openings 25 of the mating half section. Thus any mated two half sections will fit together. Additionally, the construction and arrangement of the body by providing two half portions enables a plurality of projections to be formed from one body portion. It will be noted that the body and the projections therefrom are hollow which provides a certain degree of resiliency to enable the members 18, 21 and 23 to be fitted on the projection, while requiring a minimum use of material to form the adapters and integral projections.

Preferably, the adapters are formed of lightweight material such as high impact styrene. The members 18, 21 and 23 can be formed of similar material but are preferably formed of aluminum for providing additional strength to the resulting structure. Furthermore, the physical properties of expansion of the plastic and aluminum are substantially equivalent, making them ideally suited for connecting together in the above referred to manner.

In Fig. 3 a form of the invention is denoted generally by the numeral 10 and is shown as including projections 26, 27, 28, 29 and 30 for receiving tubular members thereon to position them in a desired relationship. It will be noted that the outer end 31 of each of the projections is tapered as illustrated at 31' so that fitting of the members in telescoping relation thereover is made easier and also inhibits the possibility of cutting any one using the adapter in actual practice.

Fig. 1 illustrates a form of construction wherein the tubular member 18 represents a brace extending between a leg of a table, which leg is represented by the vertically aligned members 21 and 23 which are positioned on the projections 21' and 23' in dotted lines.

The member 22 is constructed and arranged so that it may be secured to a table top or chair seat or other piece of furniture by means of securing a screw through the opening 22' therein. The member 22 is integrally formed with a projection 22" which is tapered in a manner similar to that previously described with regard to Fig. 2 so as to fit into member 21. The member 22 may, in some instances fit into an extension integrally formed on the table or other piece of furniture in which event the top 22''' could be eliminated and a tapered projection similar to 22" framed on the member 22 to fit into the extrusion on the piece of furniture. It will be noted that the adapter denoted generally at 36 includes only one projection 36' which extends from the main body portion 37. Such adapter also serves the function of providing a footing for the leg formed by members 21 and 23.

In Fig. 4, the relationship of the two half sections 5 and 6 are illustraed when the dowels 25 are positioned in the openings 26 and it will be noted, as shown in the drawing that the projections are substantially square or rectangular and may be telescopically positioned in a rectangular opening of any suitable tubular member. Since any number of projections may be provided at any relative angle on the main body portion 11 of the present invention, it seems obvious that the adapter lends itself quite readily for use in construction of various pieces of furniture and other devices. The projections may be used for connecting and interconnecting brace members for securing them in position while also providing a means for securing the legs in position as represented in Fig. 1 of the drawings.

Of course, the adapter may be used in any situation and is not necessarily limited to its use in furnature but may be used in any apparatus or device where it is desired to position members together in a desired angular relation.

Thereafter, the tubular members such as the member 18 is fitted upon the projections as desired, in order to position them in a desired angular relation. The tapering surface on the projections causes the tubular members positioned thereon to wedge on the projections so that when the tubular members are abutted against the shoulder 19, they are firmly held in position and locked on the adapter without the aid of any screws, bolts, glue or dowels. Additional members are fitted on the other projections, as required, to form the desired structural arrangement. In some situations it may be desirable to provide an adapter wherein only one projection is used as illustrated at 22' and 36', while in other situations it may be desirable to use an adapter wherein a plurality of projections are provided as illustrated at 3 in Figs. 1 and 2, and at 10 in Fig. 3.

It is to be noted that no tools are required to assemble the adapter or to connect the tubular members therewith. It seems obvious that any suitable or desired combination of adapters and tubular members can be used to form frames for tables, chairs, shelving or any other pieces of furniture.

The present invention has proved itself quite satisfactory in practical use, in that it provides a relatively inexpensive method of permanently securing members together. Not only is the present invention relatively inexpensive as compared to present methods for securing members in relationship, but such invention also overcomes many objections of the prior art devices in that a device is provided which permanently and rigidly secures members in position and retains them in position over an extended period of time without the fear of such members becoming loose through use, thereby necessitating repair or replacement.

At any event, should repair or replacement become necessary, such may be easily accomplished merely by disassembling the structure and positioning a new adapter on the members as desired.

Broadly the invention relates to an adapter and tubular member for fitting thereon whereby the tubular member may be positioned in a desired angular relationship with a minimum of expense and effort.

What is claimed is:

A device for connecting members to position them in a desired angular relation including, a body formed of two mating half portions, said half portions being adapted to fit together to form said body, said body including a plurality of hollow projections, each of said hollow projections having a tapered surface area on its outer periphery, said tapered surface area defined by tapered surface means beginning adjacent the outer end of each of said projections and extending along each of said projections to terminate at a point spaced from said outer end but less than the length of said projection whereby the length of said tapered surface means is less than the length of said projection, a shoulder at the termination of said tapered surface on said hollow projection, and means on each of said mating portions for connecting them together when they are positioned in fitting relationship, said last named means including projection means on at least one of said half portions and openings in at least one of said half portions for receiving said projection means therein.

References Cited in the file of this patent

UNITED STATES PATENTS

| | | |
|---|---|---|
| 1,792,100 | Kohler | Feb. 10, 1931 |
| 1,979,760 | Mueller | Nov. 6, 1934 |
| 2,039,926 | Paradise | May 5, 1936 |
| 2,063,895 | Mack | Dec. 15, 1936 |
| 2,066,227 | Reukauf et al. | Dec. 29, 1936 |
| 2,198,964 | Goodyear | Apr. 30, 1940 |
| 2,817,547 | Canepa | Dec. 24, 1957 |